(12) United States Patent
Harasta

(10) Patent No.: US 6,874,730 B2
(45) Date of Patent: Apr. 5, 2005

(54) COVERING ELEMENT FOR THE INTERIOR OF A VEHICLE, PARTICULARLY AN AIRCRAFT

(75) Inventor: Stefan Harasta, Paderborn (DE)

(73) Assignee: Goodrich Hella Aerospace Lighting Systems GmbH, Lippstadt (DE)

(*) Notice: Subject to any disclaimer, the term of this patent is extended or adjusted under 35 U.S.C. 154(b) by 30 days.

(21) Appl. No.: 10/232,392

(22) Filed: Sep. 3, 2002

(65) Prior Publication Data

US 2003/0071172 A1 Apr. 17, 2003

Related U.S. Application Data

(60) Provisional application No. 60/365,544, filed on Mar. 20, 2002.

(30) Foreign Application Priority Data

Sep. 3, 2001 (DE) .......................... 101 43 011

(51) Int. Cl.$^7$ .............................................. B64D 11/00
(52) U.S. Cl. ................................................... 244/118.5
(58) Field of Search .......................... 244/118.5, 119, 244/129.4, 132; 160/94; 52/367, 460, 462–463

(56) References Cited

U.S. PATENT DOCUMENTS

| 1,856,115 A | | 5/1932 | Sallop |
| 3,327,443 A | * | 6/1967 | Gay et al. ................. 52/460 |
| 3,370,813 A | * | 2/1968 | Albertine et al. ......... 244/118.5 |
| 3,417,528 A | * | 12/1968 | Hallock ................... 52/367 |
| 3,649,069 A | | 3/1972 | Zip |
| 4,050,208 A | * | 9/1977 | Pompei et al. ............ 52/460 |
| 4,739,955 A | * | 4/1988 | Aquino et al. ........... 244/129.4 |
| 4,861,090 A | * | 8/1989 | Gavrieli |
| 4,911,219 A | | 3/1990 | Dalrymple |
| 5,014,934 A | * | 5/1991 | McClaflin ................ 244/132 |
| 5,038,531 A | * | 8/1991 | Olewska |
| 5,085,017 A | * | 2/1992 | Hararat-Tehrani ........ 244/118.5 |
| 5,117,889 A | | 6/1992 | Coe |
| 5,201,831 A | * | 4/1993 | Higgins et al. ........... 244/119 |
| 5,961,072 A | * | 10/1999 | Bodle ....................... 244/118.5 |
| 6,068,041 A | * | 5/2000 | Miles et al. |
| 6,199,798 B1 | * | 3/2001 | Stephan et al. ........... 244/119 |
| 6,435,253 B1 | * | 8/2002 | Steeves et al. |
| 6,572,304 B1 | * | 6/2003 | Hessling et al. ......... 244/118.5 |

FOREIGN PATENT DOCUMENTS

GB    2 205 794    * 12/1988

* cited by examiner

Primary Examiner—Michael J. Carone
Assistant Examiner—Lulit Semunegus
(74) Attorney, Agent, or Firm—Birch, Stewart, Kolasch & Birch, LLP

(57) ABSTRACT

A covering element for the interior the interior of a vehicle, particularly an aircraft, is provided with at least a first and a second covering portion each of which comprises a covering wall with a front side pointing to the interior of the vehicle in the installed state and a rear side Each covering portion also includes a width extension and a longitudinal extension directed transverse thereto to one another. The covering walls of the two covering portions overlap each other, and the second covering portion is supported so as to be displaced substantially in the direction of its longitudinal extension and/or to be pivoted about a pivot axis extending substantially perpendicular to its longitudinal and width extension-on the first covering portion.

19 Claims, 7 Drawing Sheets

COVERING ELEMENT FOR THE INTERIOR OF A VEHICLE, PARTICULARLY AN AIRCRAFT

This nonprovisional application claims priority under 35 U.S.C. § 119 on Patent Application No. 101 43 011.6 filed in Germany on Sep. 3, 2001, and Provisional Application No. 60/365,544, filed in the U.S. on Mar. 20, 2002, which are herein incorporated by reference.

BACKGROUND OF THE INVENTION

1. Field of the Invention

The present invention relates to a covering element for the interior of a vehicle, which particularly is an aircraft, such as an airplane.

2. Description of the Background Art

Above the seat rows in airplanes and travel busses, supply channels for fresh air extend wherein diverse functional units such as reading lights, operational elements for calling the aircraft personnel or oxygen masks, as well as oxygen sources are accommodated. Towards the vehicle interior, these supply channels are covered by covering elements. In this connection, it always happens that covering elements of different widths have to be used.

Moreover, it applies to airplanes that the supply channel at the front and back ends of the cabin, respectively, extends in a bent or arcuate shape due to the tapering of airplane fuselage sections. Then, specifically adapted covering elements are used in the region of the bend. For this purpose, the industry offers covering element sets of which individual covering elements can be used depending on the installation situation, whereas the remaining elements of the set are waste.

SUMMARY OF THE INVENTION

It is therefore an object of the invention to provide a covering element that is able to be adapted, conveniently and without any problems, to the respective installation situation.

In order to solve this object, the invention provides a covering element for the interior of a vehicle, particularly of an aircraft, which is provided with at least a first and a second covering portion, each of which comprises a covering wall with a front side pointing to the interior of the vehicle in the installed state and a rear side, as well as a width extension and a longitudinal extension directed transversely thereto. The covering walls of the two covering portions overlap each other, with the second covering portion being supported so as to be displaced substantially in the direction of its longitudinal extension and/or to be pivoted about a pivot axis extending substantially vertically, e.g., perpendicular, to its longitudinal and its width extension, respectively, on the first covering portion.

The covering element according to the invention comprises at least two covering portions, one of two neighboring covering portions being movably supported on the respectively other one. The second covering portion, for example, is movably supported and guided on the first one. Both covering portions comprise a covering wall having a front side and a rear side. In the installed state, the front side faces the interior of the vehicle. Each covering portion has a width extension (directed transversely to the direction of motion of the vehicle or—more general—transversely to the succession of covering elements arranged next to each other) and a longitudinal extension (directed in the direction of motion or—more general—along the succession of covering elements arranged next to each other). The covering walls of the two covering portions are arranged to overlap each other. This applies to substantially all positions of relative movement of both covering portions.

According to the invention, two neighboring covering portions of the covering element according to the invention are respectively able to perform at least one of two relative movements. These are, on the one hand, a lateral movement in longitudinal extension of both covering portions, whereby the longitudinal dimension of the covering element is changeable. The second relative movement of both covering portions possible is a pivotal movement where both covering portions are able to be pivoted about a pivot axis extending vertically, e.g., perpendicular, to the longitudinal and width extension of the covering portions.

A covering portion according to the invention with the possibility of a relative lateral movement of two covering portions, respectively, makes it possible to produce a covering element corresponding to the length of the area to be covered (viewed in the direction of motion). Hence, the covering element is telescopic in the manner of a telescope. A pivotal movement of respectively two covering portions of the covering element according to the invention makes it possible to use such a covering element in the bent or curved region of a channel to be covered or the like component in the interior of a vehicle.

With the covering element according to the invention, it is thus possible to orientate the covering portions relative to each other in accordance with the installation situation. The covering of the vehicle component is then effected with a single unit, i.e., the covering element according to the invention. Hence, sets of individual covering portions are no longer necessary.

Upon viewing the front side of the covering element, only a visible edge is to be seen where the transition of the one covering wall to the other is located, which, as a whole, makes the impression of a one-piece and neatly finished and mounted covering element.

As already explained above, the covering element according to the invention may comprise more than two covering portions, wherein it is useful when two neighboring covering portions, respectively, are supported at each other so as to be movable (i.e. adapted to be displaced and/or pivoted) relative to each other. Above and hereinafter, only for reasons of simplicity, the invention is described with respect to one covering element comprising two covering portions.

In an advantageous embodiment of the invention, it is provided that the one covering portion comprises at least two encompassing projections by which it encompasses the other covering portion. These encompassing projections are arranged at the two ends defining the width extension of the covering portion. Each of the encompassing projections extends over a relatively small distance in the longitudinal direction of the covering portions so that for a covering element, the covering portions of which are at least able to be pivoted, this movement is possible. If the length of the encompassing projections in the longitudinal extension of the respective covering portion is too great, the ability of pivoting is rather restricted because of the guidance along a line (in contrast to guidance at individual points described before).

In another advantageous embodiment of the invention, it is provided that each covering portion is provided with border sections rising from its covering wall, except for the mutually overlapping portions of the covering walls.

Usefully, no rising border sections are provided in these regions since they would be a nuisance because of the overlapping. In case of two covering portions comprising substantially rectangular covering walls, they would thus be provided with rising border sections at three edges. In case of a covering element with more than two covering portions, the middle covering portions would only comprise two rising border sections at their borders defining the width extension.

In the interior of the vehicle, the covering elements are fastened to holding structures preferably provided particularly therefor. In case of an aircraft as well as the attachment of the covering elements above the seat rows, these holding structures are mostly profile strips to which fastening elements can be fastened, which, in turn, are connected with the covering elements. In the configuration of the covering element according to the invention, it is now advantageously provided that only one of two neighboring covering portions is provided with at least one fastening element. The second covering element that does not have any separate fastening element is held at the other covering portion. If the covering element has more than two, for example three, covering portions, it is quite possible that the two outside covering portions have at least one fastening element each, whereas the at least one covering portion located therebetween has no separate fastening element.

When mounting the covering element according to the invention, it is provided that the covering portions movable relative to each other are first oriented in correspondence with the installation room to be covered. For the covering portions to keep the once set relative positions during the further handling in connection with the installation of the covering portion and thereafter, it is advantageous if the covering portions are provided with cooperating fixing elements preventing an undesired relative movement. Usefully, these fixing elements are variable in length dimension and should preferably be bendable if the covering portions are able to perform relative pivotal movements. Basically, such a fixing element can engage the covering portion at any point thereof. Preferably, the fixing element is arranged on the rear side of the covering portions to be invisible in the installed state of the covering element.

In an advantageous embodiment of the invention, two connection elements each of which is arranged at a different covering portion can be fixed relative to each other by means of the fixing element. Upon adjusting the covering portions, the two connection elements move relative to each other and can be fixed relative to each other by the fixing element. Advantageously, each connection element is arranged at the rear side of the respective covering portion as well.

It is advantageous if each connection element is configured as a web projecting from the rear side of the covering wall of the respective covering portion, which extends in the longitudinal extension direction of the covering portion. Two such webs of neighboring covering portions contact each other, even in the position of maximum withdrawal. In other words, they project beyond the overlapping portion of a covering portion so that both webs overlap each other even in the position of maximum withdrawal. In this overlapping region, the fixing element is force-fittingly connected with the webs.

It is useful when the webs begin at the opposed ends of the two covering portions defining the longitudinal extension of the covering element and extend so as to be directed toward each other in the manner of tongues bendable in the width extension. Where the tongues contact each other, a fixing element, preferably in the form of a clamp, can be force-fittingly connected. Additionally, this clamp comprises clawing elements for clawing into the webs. Thus, a force-fit connection of the two webs is realized via the clamp-shaped fixing element. Another positive locking of the two webs, however, may be an alternative for the configuration of a fixing element. It is conceivable, for example, that the webs are provided with peg/hole pairs lockingly engaging with each other in the different relative positions of two neighboring covering elements.

For the installer to be provided with the fixing elements directly at the site, it is useful when these fixing elements are directly supplied by the supplier together with the covering element. The fixing elements can be held at the covering element, for example; to this end, the covering portion(s) is/are provided with corresponding holding receptacles intended therefor. After the installer has completed the presetting of the covering portions, he takes out the fixing element(s) and directly attaches them to the covering portions or the connection elements thereof.

For the covering portions to be unable to unintentionally move relative to each other after the presetting has been effected, it is advantageous when the covering element is provided with a pre-locking device. In the simplest case, this prelocking device is configured at two contacting aforementioned webs, these two webs cooperating in such a manner that they only can be moved relative to each other when a minimum force has been raised, without a fixing element being used. This force-fit connection, for example, is configured as frictional engagement or positive fit. A positive fit can be advantageously realized by a locking connection comprising at least one locking recess at the one web and at least one locking projection dipping into the locking recess at the other web. Advantageously, several locking recesses and locking projections, respectively, are provided, arranged successively in the direction of relative movement of the two webs. Thus, toothed rack-like structures engaging with each other are created at both webs.

Alternatively, however, it is also possible to configure the pre-locking device at other elements of the covering portions, which are particularly provided for this purpose. It is possible, for example, that, at the one covering portion, a web or tongue-like projection spaced from the rear side of its covering wall by the thickness of the covering wall is configured, the covering wall of the other covering portion dipping into the gap between this web or projection and the covering portion. Thereby, a force fit of the one covering portion at the other is created. By dimensioning correspondingly (press fit, for example), the pre-locking device is realized by frictional engagement; alternatively thereto, a positive connection can also be realized by a corresponding toothing at the web or projection as well as at the rear side of the covering portion encompassed by the web.

If, as indicated above according to the first alternative configuration of the pre-locking device, a pair of webs with locking recesses and locking projections is used, it is advantageous if these webs are flexible at their ends facing the respectively other covering portion. Thereby, the webs can be bent within the width extension of the covering portions, which is required for the realization of a pivotal movement of neighboring covering portions.

In the afore-described case, it is useful if the one web comprises an encompassing section for encompassing the other web. Thereby, both webs are always in tight contact which is advantageous for the force-fitting contact of both webs. Thus, a receptacle is created between the encompassing section and the one web, in which receptacle the other web is dipped. Then, this other web is enclosed at two sides (namely by the other web, on the one hand, and by the encompassing section thereof, on the other hand).

The locking projections and the locking recesses, respectively, can be arranged at the sides of both webs, which face each other, but also at the inside of the encompassing section and the outside of the other web facing the latter.

For the covering element according to the invention to be unable to be moved beyond a maximum withdrawal and/or pivotal movement of two neighboring covering portions, it is advantageous if the covering portions have cooperating stop faces. Principally, these stop faces can be arranged at any conceivable position of the covering portions which are located adjacently in the maximum movement positions. It is possible, for example, to arrange the stop faces at the insides of the borders of the covering walls. It is advantageous, however, when the stop faces are arranged at the webs and particularly at the webs of the pre-locking device. Then, a stop face at the end of the web encompassed by the encompassing section cooperates with the encompassing section of the other web for defining the positions of maximum withdrawal and pivotal movements, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
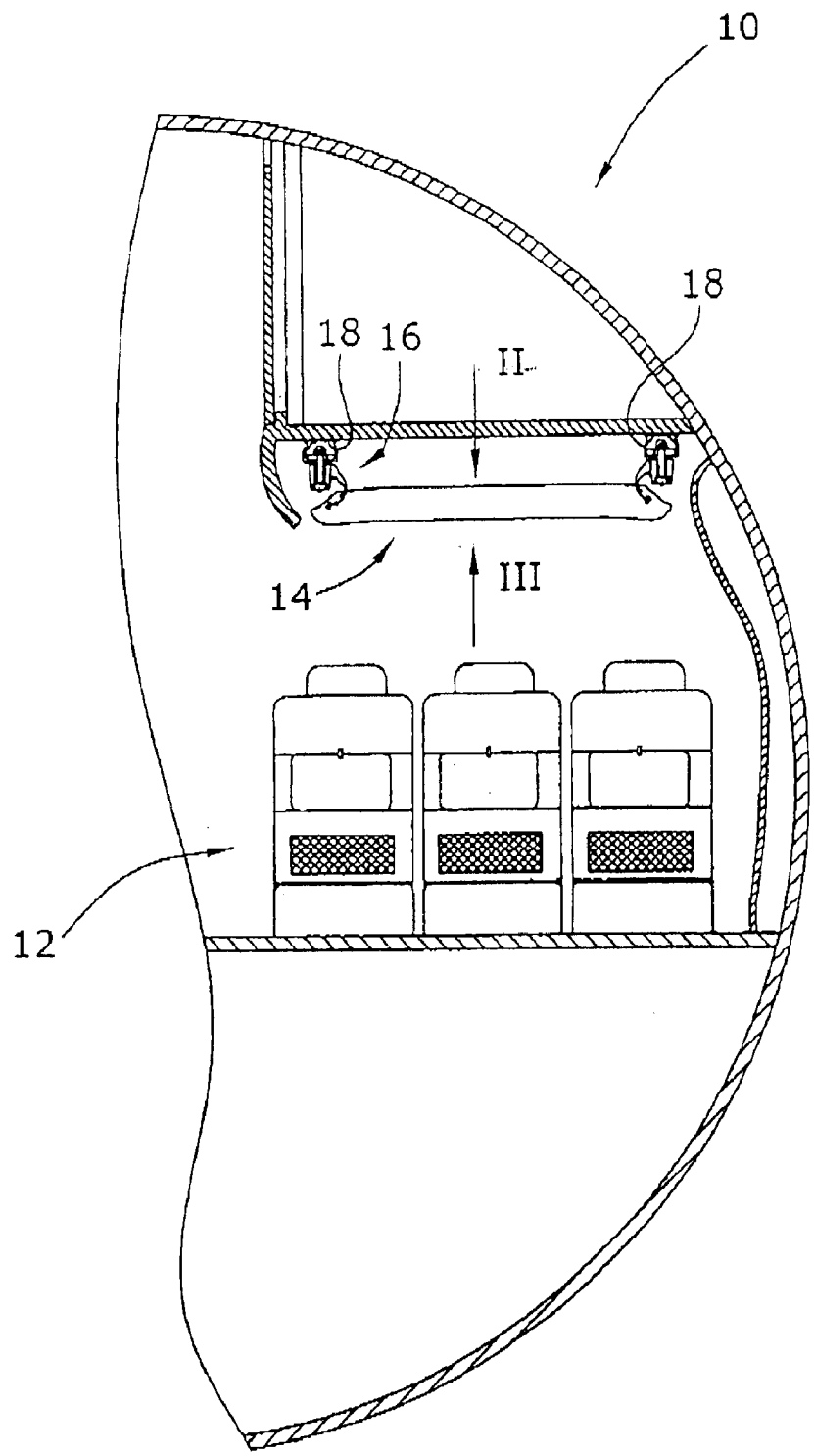
FIG. 1 is a partial cross section of a fuselage of an airplane for explaining the installation position of a covering element according to the invention.

FIG. 1 shows, in a greatly simplified manner, a partial cross section through a fuselage of an airplane 10 including seat rows 12 over which several covering elements 14, which cover a (non-illustrated) supply channel, are arranged. The covering elements 14 are fastened to holding strips 18 of the airplane 10 by fastening elements 16.

Most of the covering elements 14 comprise fixed longitudinal extensions defined by their installations (reading lights, air nozzles, oxygen masks). In addition, there are so-called fill-in panels providing for a distance between the afore-described covering elements 14 corresponding to the distance between the seat rows.

Moreover, covering elements which are variable in length are sometimes required, or covering elements which can be used for covering the bent or curved portions of the supply channels are desirable. Such portions, for example, can be found toward the front and rear ends of the airplane fuselage, respectively, where the cylindrical portion of the fuselage and the tapering end portions blend.

In FIGS. 2 to 9, a covering element 20 that is adaptable in length as well as usable in the bent or curved portion of the supply channel is illustrated in detail. The covering element 20 comprises several covering portions 22,24, which are movable relative to each other (a first covering portion and a second covering portion in this embodiment, but it is also possible to provide three or four or more covering portions per covering element). Each covering portion 22,24 comprises a covering wall 26, 28, which are substantially quadrangular in this embodiment and are defined by rising longitudinal borders 29,30 and transverse borders 32,34 at the longitudinal sides and the transverse sides, respectively. The two covering portions 22,24 are adapted to be displaced and pivoted relative to each other, respectively, their covering walls 26,28 overlapping each other in an overlapping region 36. This overlapping region 36 is defined by the respective relative position of a longitudinal edge 38,40 of the two covering walls 26,28, facing the other covering portion 22,24, respectively.

At each of the two transverse borders 34, the second covering portion 24 comprises an encompassing projection 42 that encompasses both of the transverse borders 32 of the first covering portion 22. Thereby, the first covering portion 22 can be displaced into the second covering portion 24 for adapting the entire length of the covering element 20 (distance between the two longitudinal borders 29 and 30 of the two covering portions 22,24). Near each of its transverse edges 32, the first covering portion contains the fastening elements 16, of which only one is shown in FIGS. 2 and 8 for clarification.

Figure 2:
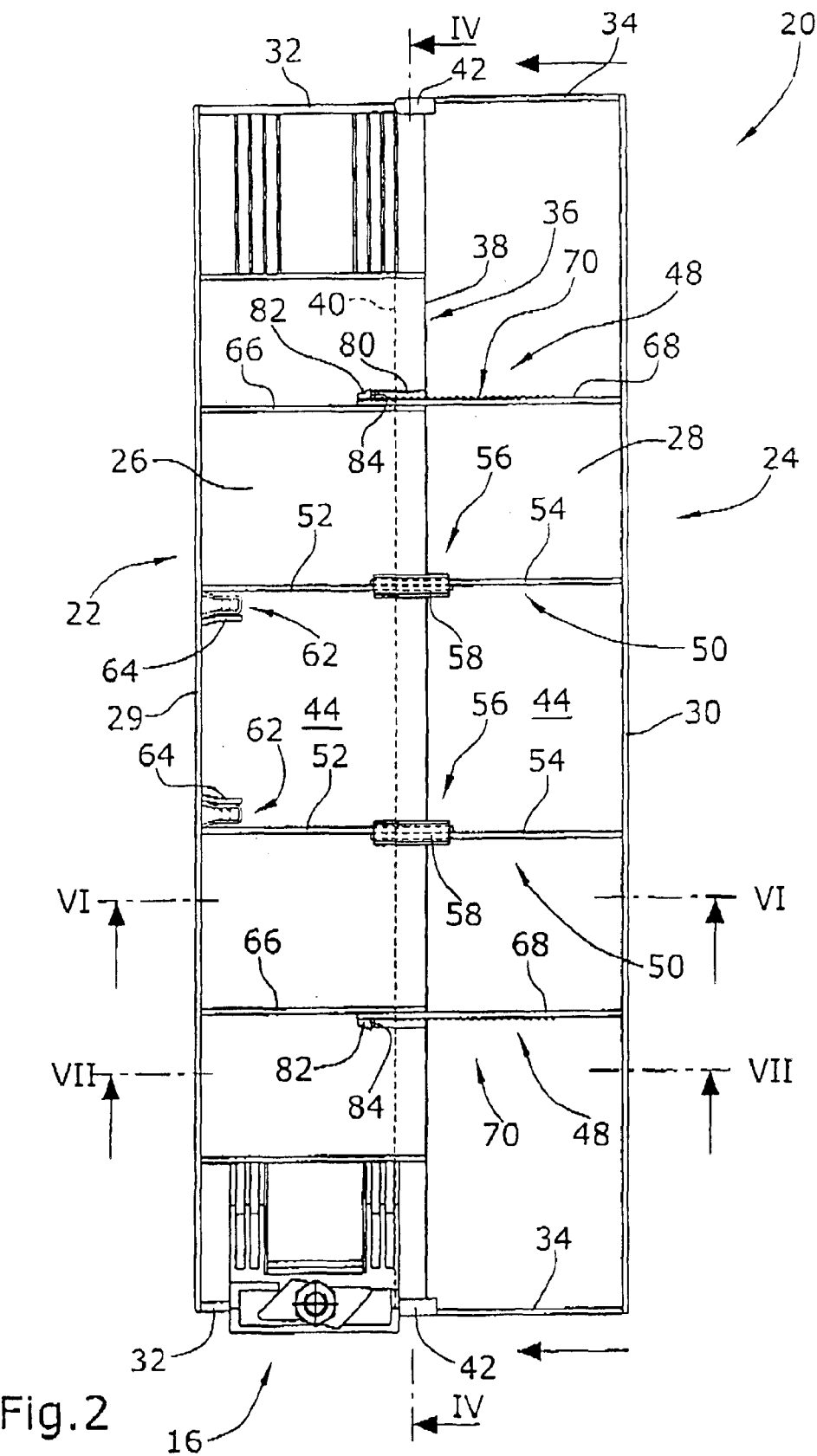
FIG. 2 is a top view of the rear side of the covering element according to arrow 11 of FIG. 1, which faces away from the interior of the airplane in the installed state, with the covering portions being in their position of maximum withdrawal.

In FIG. 2, the two covering portions 22,24 are shown in their position of maximum withdrawal, in other words, the covering element 20 is fully extended, e.g., pulled out, with rear sides 44 of the two covering portions 22,24 of the covering element 20 being shown.

Figure 3:
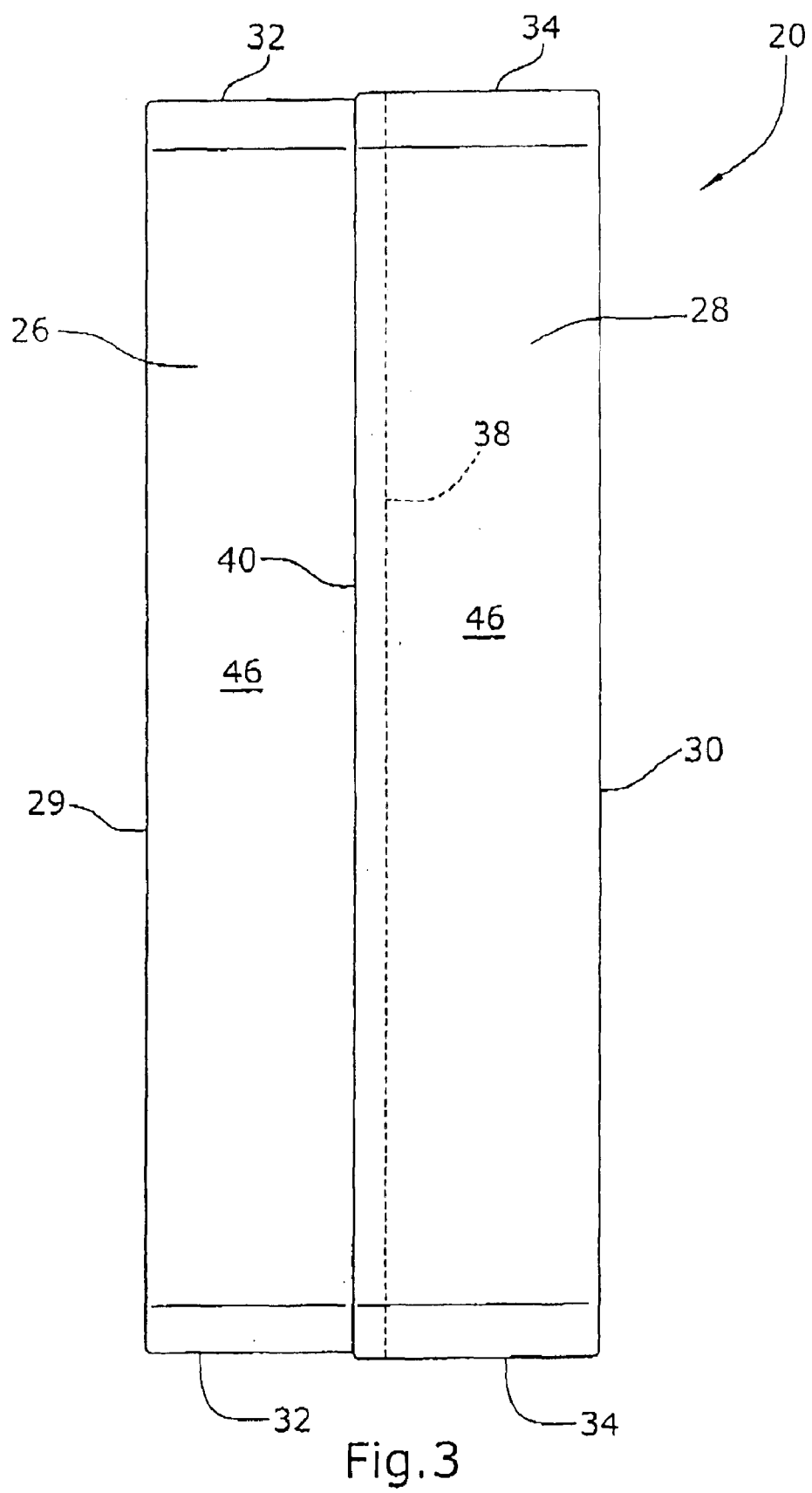
FIG. 3 is a top view of the front side of the covering element according to arrow III of FIG. 1.

FIG. 3 shows the covering element 20 according to FIG. 2, viewed from a front side 46 of the covering walls 26,28.

Figure 4:
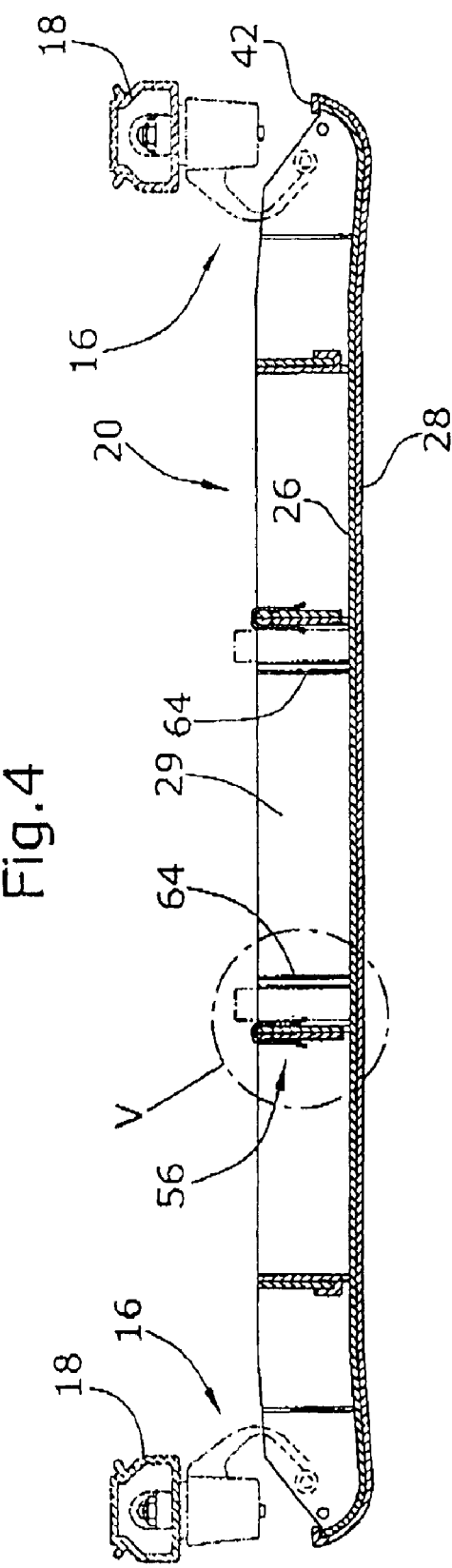
FIG. 4 is a longitudinal section according to line IV—IV of FIG. 2.
Figure 5:
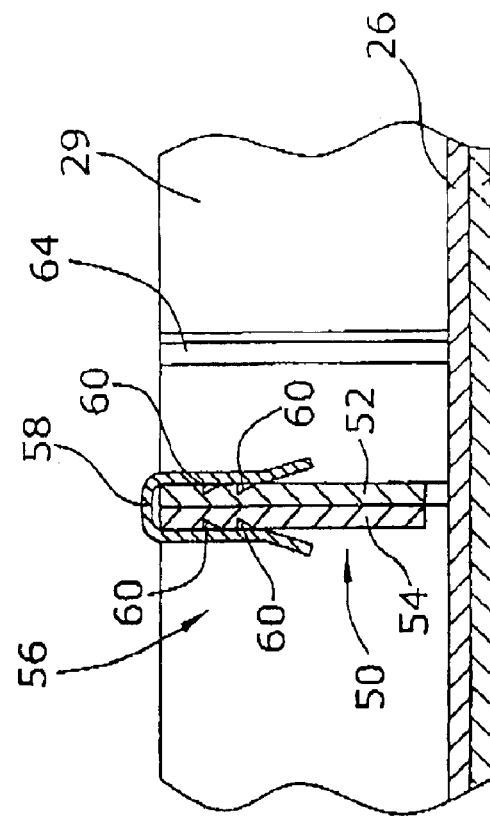
FIG. 5 is an enlarged representation of the region V of FIG. 4.
Figure 6:
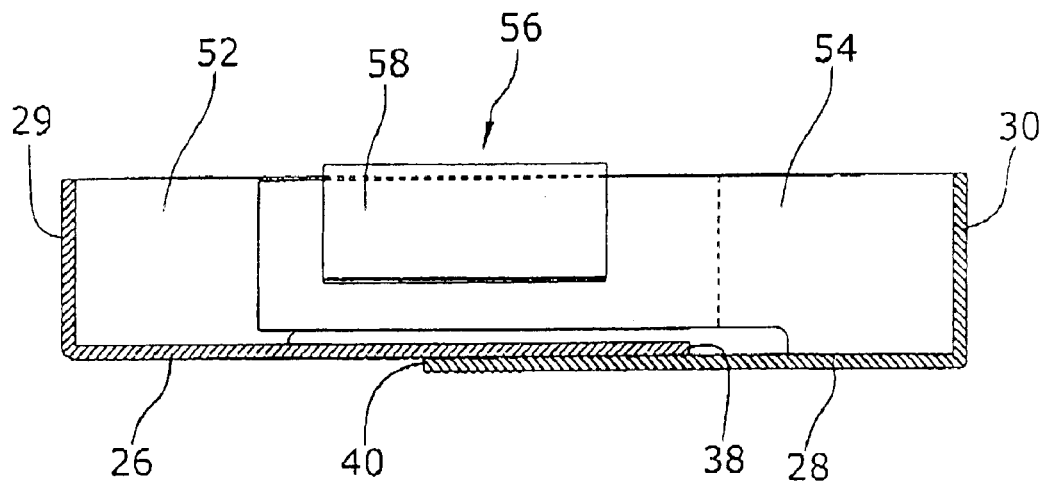
FIG. 6 is a longitudinal section along the line VI—VI of FIG. 2.
Figure 8:
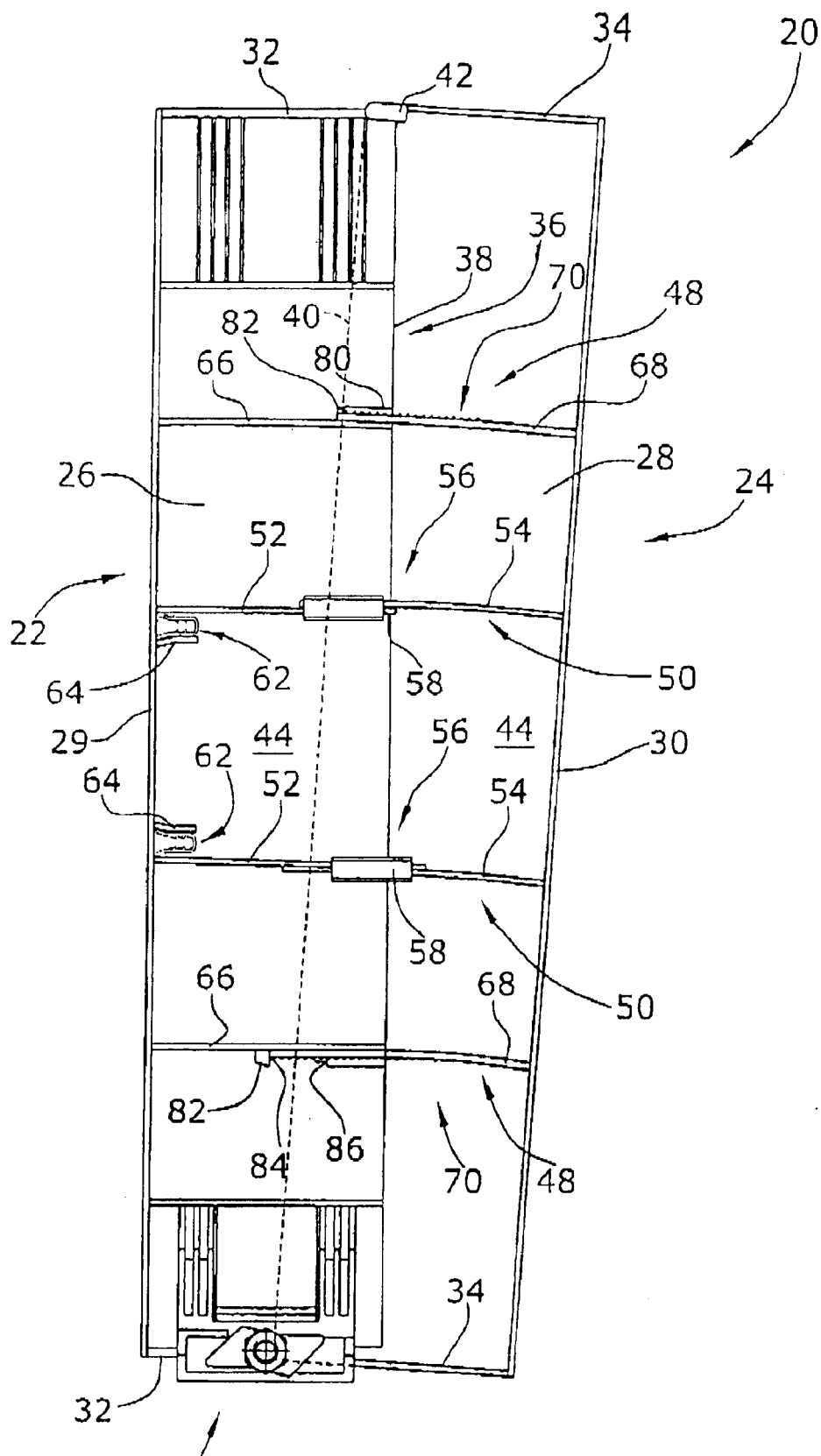
FIG. 8 is a view of the covering element corresponding to arrow II of FIG. 1, but with covering portions pivoted relative to each other.

As can be seen particularly in FIGS. 2 and 8, in this embodiment, four pairs of webs 48,50 are located at the rear sides 44 of the covering walls 26,28 of both covering portions 22,24. When viewed in a width extension direction of the covering element 20, there are two outer web pairs 48, between which two inner web pairs 50 are arranged, whereby the width extension extends between the two transverse borders 34. Each of the two inner web pairs 50 comprises two webs 52,54 that are arranged at different covering portions 22,24 and extend from the longitudinal borders 29,30 in a longitudinal extension direction of the covering portions 22,24 to beyond the longitudinal edges 38 and 40 of their respective covering wall 26,28. The two webs 52,54 of each web pair 50 are in mutual contact and are connected with their respective covering wall 26,28 in their portion adjacent to the respective longitudinal border 29,30 (see FIG. 6). Onto the webs 52,54 of each of the two web pairs 50, a fixing element 56 is set. The fixing element 56 is in the form of a clamp 58, which has a U-shaped cross section, as can be seen in FIGS. 4 and 5, and comprises inner clawing elements 60 in the form of barb-like projections, which penetrate into the sides of the webs 52,54 and claw into the sides.

Via the clamp 58, the two webs 52,54 of each web pair 50 are force-fittingly connected with each other. This means that a connection device for the force-fit connection and fixing of the two covering portions 22,24 is realized by two connection elements in the form of the webs 52,54 and a fixing element 56 in the form of the clamp 58.

When the clamps 58 are not set upon the web pairs 50, they are accommodated in receptacles 62 of the first covering portion 22. These receptacles 62 are configured as pockets that are formed, on the one hand, by the webs 52 and, on the other hand, by projections 64 projecting from the longitudinal border 29 of the first covering portion 28 (see FIGS. 2, 4 and 5).

Figure 7:
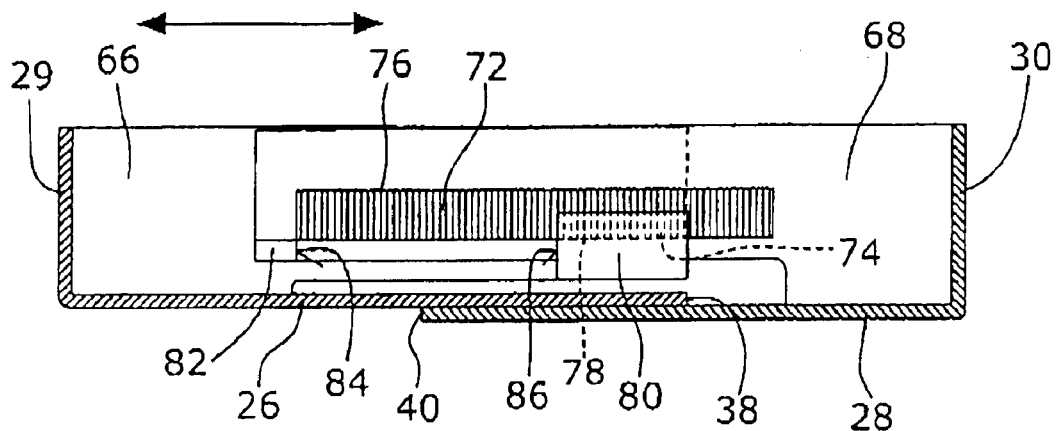
FIG. 7 is a section along the line VII—VII of FIG. 2.

Each of the outer web pairs already mentioned above also comprises two webs 66,68 connected with the covering portions 22,24 as are the webs 52,54. In contrast to the webs 52,54, the webs 66,68 each comprise a locking device 70 preventing an undesired adjustment of the two covering portions 22,24 as long as the fixing clamps 58 have not yet been set. Each locking device 70 is provided with a plurality of locking recesses 72,74 and locking projections 76,78 at the one web 68 as well as at an encompassing section 80 of the other web 66. The encompassing section 80 partially encompasses the web 68, whereby the locking recesses 72,74 and locking projections 76,78 are arranged so as to be opposed to each other and engage into each other. Referring to FIGS. 7 and 8, it can be seen that the encompassing section 80 is formed on an end portion of the web 66 in a U-shaped manner to thereby partially encompass the web 68 therein.

First, the locking devices 70 shall prevent that the two covering portions 22,24 are able to unintentionally move (displace or pivot) relative to each other after they have been preset by the installer. If this should nevertheless happen, this relative movement is accompanied by an acoustically audible signal produced when the locking recesses and locking projections slide against one another. To the installer, this signals a relative displacement or relative pivoting of the two covering portions. When the webs 66,68 of the two web pairs 48 are interlocked, this is, so to speak, a pre-locking device for locking the two covering portions 22,24 in their respective adjustment position as long as the fixing clamps 58 have not yet been attached.

In this embodiment, two stop projections 82 arranged at the free ends of the webs 68 of the web pairs 48, which ends face away from the longitudinal border 30, serve to define the position of maximum withdrawal as well as the position of maximum pivoting. These stop projections 82 comprise stop faces 84 cooperating with counter-stop faces 86 that are formed by the encompassing sections 80 of the webs 66 (see FIGS. 2 and 8 and particularly FIG. 7).

Figure 9:
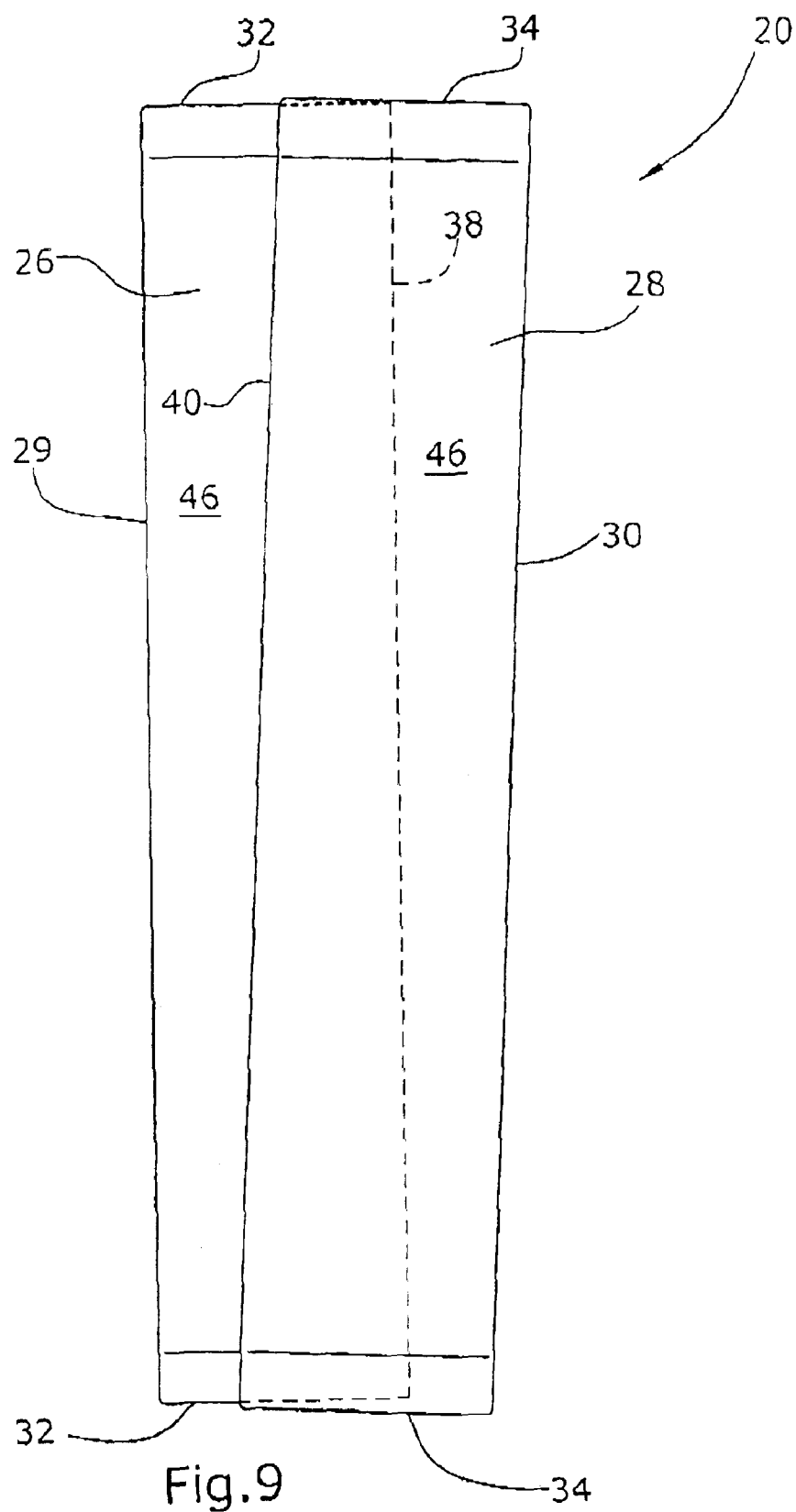
FIG. 9 is a view corresponding to arrow III of FIG. 1, with covering portions of the covering element pivoted relative to each other.

As already explained above, the covering element 20 described herein cannot only be linearly withdrawn or pushed together, but can also be pivoted (see FIGS. 8 and 9). The punctual contact, realized by the encompassing projections 42, realizes this pivotal movement, together with a certain clearance with which the two covering portions 22,24 are put into each other. For this pivotal movement, a flexible configuration of the webs 52,54,66,68 is additionally required which, as described above, is given. The pivotal movement of both covering portions 22,24 is effected about a pivot axis extending vertically, e.g., perpendicular to the covering walls 26,28, which, in case of FIGS. 8 and 9, stands vertically on the drawing plane.

It is to be emphasized here that the embodiment of a covering element described with reference to the drawing facilitates both kinds of relative movement (displacement and pivotal movement) of the two covering portions 22,24. The invention, however, is not necessarily restricted to that both kinds of relative movement can be realized at one and the same covering element and between two respectively adjacent covering portions of a covering element, respectively. It is also possible, for example, that the two covering portions of a covering element can either be only linearly displaced or only pivoted. Even if a covering element comprises more than two covering portions, it is possible that respectively adjacent covering portions can either be only displaced or only pivoted. It is also possible to realize a covering element according to the invention which comprises more than two covering portions of which respectively adjacent ones can only perform a relative movement to each other. In other words, the invention is neither restricted to a specific number of covering portions nor to the realization of respectively one kind of relative movement only. All combinations of kinds of relative movement and numbers of covering portions are possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A covering element comprising:
   at least a first and a second covering portion, each of which includes a covering wall having a front side directed towards an interior of the vehicle in an installed state and a rear side, each covering wall further including a width extension and a longitudinal extension, the longitudinal extension being transverse to the width extension,
   wherein each covering wall of the first and second covering portions overlaps each other,
   wherein the second covering portion is supported so as to be pivoted onto the first covering portion about a pivot axis extending substantially perpendicular to its longitudinal and width extension,
   wherein at least one fixing element cooperates with the first and second covering portions to prevent movement of the first and second covering portions relative to one another when the first and second covering portions are in an intended relative position,
   wherein at least one connection element is arranged at each covering portion so that the at least two connection elements also move relative to each other upon a relative movement of the two covering portions, and
   wherein the at least two connection elements are adapted to be fixed by means of the fixing element to prevent an unintentional relative movement of the two covering portions.

2. The covering element according to claim 1, wherein the second covering portion includes at least one encompassing projection at each opposite end of the width extension, for encompassing a corresponding end of the first covering portion and for guiding the second covering portion to the first covering portion.

3. The covering element according to claim 1, wherein the covering walls of the first and second covering portions are defined by rising borders, excluding a region of mutual overlapping.

4. The covering element according to claim 1, wherein at least one of the two covering portions comprises at least one fastening element for being fastened to the vehicle.

5. The covering element according to claim 1, wherein at least one fixing element cooperates with the first and second covering portions to prevent movement of the first and second covering portions relative to one another when the first and second covering portions are in an intended relative position.

6. The covering element according to claim 1, wherein each connection element is configured as a web that projects from the rear side of the covering wall of the respective covering portion and extends in a longitudinal extension direction of the covering portion, such that the webs of their respective two connection elements of the two covering portions are in mutual contact, and such that the fixing element force-fittingly connects the two webs with each other.

7. The covering element according to claim 6, wherein the fixing element is a clamp adapted to be put upon the two webs that are in contact with one another and wherein the clamp comprises clawing elements for clawing into the webs.

8. The covering element according to claim 6, wherein the webs of the two covering portions, at their ends facing the respective other covering portion, are flexible and bendable in the width extension direction of the covering portions.

9. The covering element according to claim 1, further comprising a pre-locking device for pre-locking the first and second covering portions in their respective position of relative movement.

10. The covering element according to claim 9, wherein the pre-locking device comprises at least two pre-locking elements arranged at two different covering portions, said pre-locking elements being in mutual contact and adapted to be connected with each other against unintentional relative movements.

11. The covering element according to claim 9, wherein each pre-locking element is configured as a web projecting from the rear side of the covering wall of the respective covering portion and extends in a longitudinal extension direction of the covering portion, and wherein the two webs are in mutual contact.

12. The covering element according to claim 11, wherein the webs, of each pair of pre-locking elements, are lockingly connected with each other, the one web comprising at least one locking recess and the other web comprising at least one locking projection.

13. The covering element according to claim 11, wherein the webs of the pre-locking device, at their ends facing their respective other covering portion, are flexible and bendable in the width extension direction of the covering portions.

14. The covering element according to claim 4, wherein the web of the one pre-locking element comprises an encompassing section for encompassing the web of the other pre-locking element.

15. The covering element according to claim 14, wherein the at least one locking projection and the at least one locking recess are formed at the side faces of the encompassing section of the one web and of the other web, which face each other.

16. The covering element according to claim 15, further comprising stop faces for restricting a maximum withdrawal movement of the two covering portions in the longitudinal extension direction thereof and/or for restricting a maximum pivotal movement of the covering portions.

17. The covering element according to claim 16, wherein the stop faces are arranged at the webs of the pre-locking elements and/or connection elements.

18. The covering element according to claim 16, wherein one stop face is formed at a projection of a web of the pre-locking device encompassed by an encompassing section, the projection contacting the encompassing section in the position of maximum withdrawal movement and/or in the position of maximum pivotal movement.

19. The covering element according to claim 1, wherein the second covering portion is supported so as to be displaced onto the first covering portion substantially in a longitudinal extension direction.

* * * * *